(12) United States Patent
Leachman et al.

(10) Patent No.: US 10,435,294 B2
(45) Date of Patent: Oct. 8, 2019

(54) PARA-ORTHOHYDROGEN CONVERSION USING A VORTEX TUBE

(71) Applicant: Washington State University, Pullman, WA (US)

(72) Inventors: Jacob William Leachman, Pullman, WA (US); Carl Dale Bunge, Pullman, WA (US)

(73) Assignee: Washington State Universiy, Pullman, WA (US)

( * ) Notice: Subject to any disclaimer, the term of this patent is extended or adjusted under 35 U.S.C. 154(b) by 0 days.

(21) Appl. No.: 16/200,363

(22) Filed: Nov. 26, 2018

(65) Prior Publication Data

US 2019/0092635 A1 Mar. 28, 2019

Related U.S. Application Data

(62) Division of application No. 14/991,775, filed on Jan. 8, 2016, now abandoned.

(60) Provisional application No. 62/101,593, filed on Jan. 9, 2015.

(51) Int. Cl.
*C01B 3/00* (2006.01)
*B01J 19/24* (2006.01)
*B01J 19/00* (2006.01)
*F25B 9/04* (2006.01)

(52) U.S. Cl.
CPC .......... *C01B 3/0089* (2013.01); *B01J 19/006* (2013.01); *B01J 19/0053* (2013.01); *B01J 19/2405* (2013.01); *B01J 19/2415* (2013.01); *F25B 9/04* (2013.01); *B01J 2219/00063* (2013.01); *B01J 2219/00155* (2013.01); *B01J 2219/00159* (2013.01); *B01J 2219/00162* (2013.01); *B01J 2219/00164* (2013.01); *B01J 2219/00186* (2013.01); *B01J 2219/00765* (2013.01); *B01J 2219/24* (2013.01); *F25J 2205/10* (2013.01)

(58) Field of Classification Search
CPC ................................. F25B 9/04; F25J 2205/10
USPC .............................................................. 62/5
See application file for complete search history.

(56) References Cited

U.S. PATENT DOCUMENTS

| 3,208,229 A | 9/1965 | Fulton |
| 3,383,176 A | 5/1968 | Keith |
| 5,483,801 A | 1/1996 | Craze |
| 2004/0040316 A1 | 3/2004 | Bradley et al. |

(Continued)

OTHER PUBLICATIONS

Belden, "Another Home Made Ranque-Hilsch Vortex Tube," retrieved from <<http://ottobelden.blogspot.coml20 10/121 another -home-made-ranque-hilsch -vortex.html>> on Dec. 25, 2017, 11 pages.

(Continued)

*Primary Examiner* — Tareq Alosh
(74) *Attorney, Agent, or Firm* — Lee & Hayes, P.C.

(57) ABSTRACT

A para-orthohydrogen conversion device comprises a vortex tube. The vortex tube may include an inlet disposed at a first end of the vortex tube, a catalyst disposed on the interior wall of the vortex tube, a first outlet comprising an opening on the perimeter of a second end of the vortex tube, a stopper disposed at the center of the second end of the vortex tube, and a second outlet disposed on the first end of the vortex tube. A method includes converting parahydrogen to orthohydrogen via the catalyst and rotational force as hydrogen gas moves through the vortex tube such that cooled parahydrogen-rich gas or liquid hydrogen accumulates near the center of the vortex tube.

15 Claims, 6 Drawing Sheets

(56) References Cited

U.S. PATENT DOCUMENTS

| | | |
|---|---|---|
| 2005/0287025 A1 | 12/2005 | Eriksson et al. |
| 2009/0130514 A1 | 5/2009 | Okura et al. |
| 2009/0165887 A1 | 7/2009 | Casey et al. |
| 2014/0120437 A1 | 5/2014 | Fernandes et al. |
| 2014/0373951 A1 | 12/2014 | Griffin, Jr. et al. |
| 2015/0330422 A1 | 11/2015 | Brock et al. |
| 2016/0344051 A1 | 11/2016 | Hotto |

OTHER PUBLICATIONS

Office action for U.S. Appl. 14/991,775 , dated Jan. 4, 2018, Leachman, "Para-Orthohydrogen Conversion Using a Vortex Tube", 19 pages.

Office action for U.S. Appl. 14/991,775 , dated Feb. 17, 2017, Leachman, "Para-Orthohydrogen Conversion Using a Vortex Tube", 12 pages.

Office action for U.S. Appl. 14/991,775 , dated Jul. 11, 2017, Leachman, "Para-Orthohydrogen Conversion Using a Vortex Tube", 10 pages.

Office action for U.S. Appl. 14/991,775 , dated Jul. 26, 2018, Leachman, "Para-Orthohydrogen Conversion Using a Vortex Tube", 23 pages.

PCT Search Report and Written Opinion dated Mar. 16, 2016 for PCT Application No. PCT/US16/12737, 9 pages.

PARA-ORTHOHYDROGEN CONVERSION USING A VORTEX TUBE

CROSS REFERENCE TO RELATED APPLICATIONS

This application is a divisional of, and claims priority to, U.S. patent application Ser. No. 14/991,775 filed Jan. 8, 2016, entitled "Para-Orthohydrogen Using a Vortex Tube," which claims priority to U.S. Provisional Patent Application No. 62/101,593 filed Jan. 9, 2015, entitled "Device to Separate and Convert Ortho & Parahydrogen Using a Vortex Tube with Catalyst," the entire contents of each being hereby incorporated by reference in their entireties.

BACKGROUND

Cryogenic refrigeration finds applicability in many fields, including liquefaction of certain gases, space travel, and fuel storage, for example. Systems that aid in cryogenic refrigeration operate at cryogenic temperatures, which can be at or below −150° C. To reach such temperatures, heat must be removed from the system in question. Typical refrigeration systems utilize circulating refrigerants and heat pumps to extract or dissipate heat from the system. These techniques require a number of moving parts and are often heavy. Moving parts are more prone to breakage at cryogenic temperatures due to the increased brittleness at such low temperatures. Additionally, heavy refrigeration systems have disadvantages in certain applications, such as space travel, where weight can negatively impact fuel requirements and limit travel distance and time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
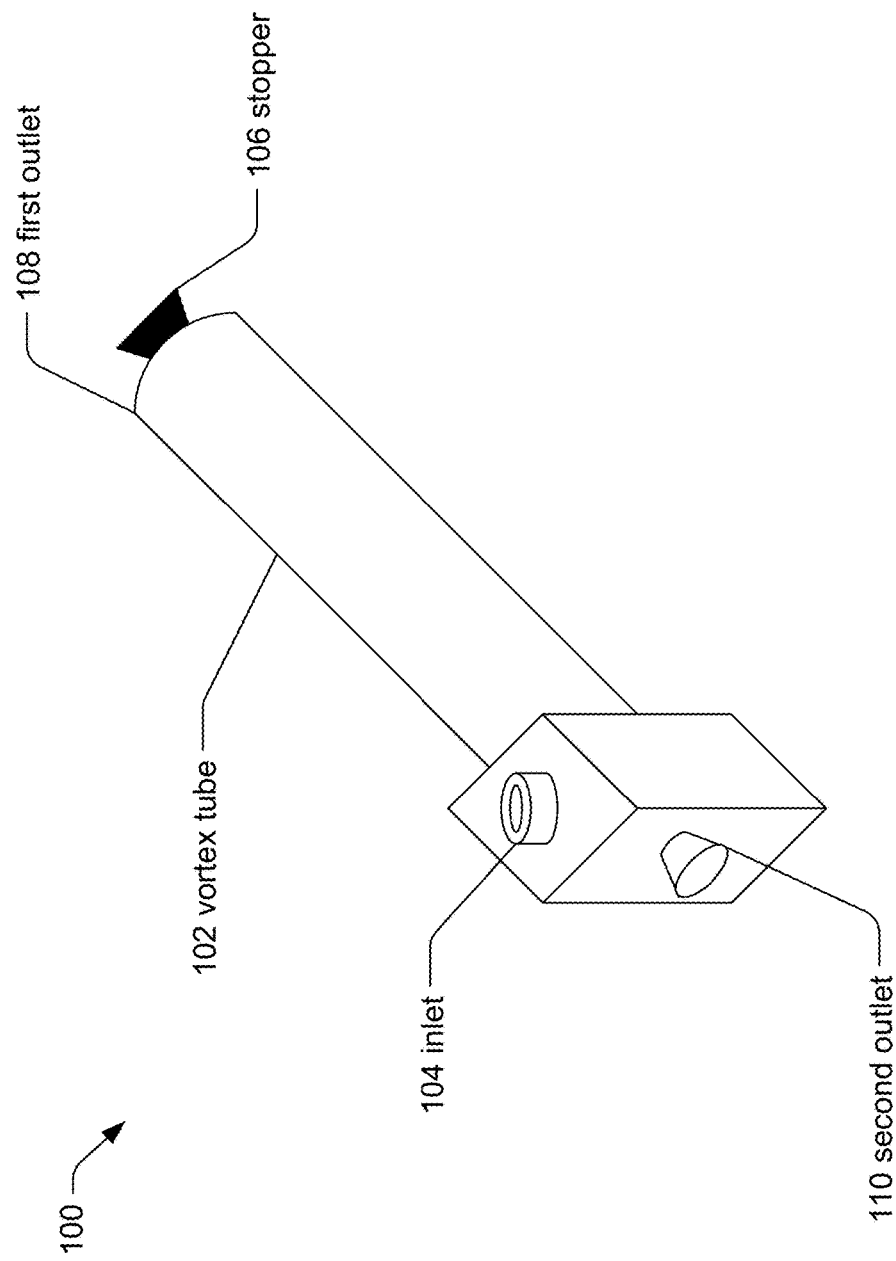
FIG. 1 illustrates a perspective view of an example para-orthohydrogen conversion device.

This overview, including section titles, is provided to introduce a selection of concepts in a simplified form that are further described below. The overview is provided for the reader's convenience and is not intended to limit the scope of the implementations or claims, nor the proceeding sections.

This disclosure describes devices and methods for para-orthohydrogen conversion.

As discussed above, cryogenic refrigeration systems operate at cryogenic temperatures, which can be at or below −150° C. Typical refrigeration systems utilize circulating refrigerants and heat pumps, which require a number of moving parts that are prone to breakage at cryogenic temperatures. Additionally, such refrigeration systems are heavy, which causes disadvantages in certain applications such as space travel. Example devices and methods as described herein alleviate the shortcomings of current cryogenic refrigeration systems by employing a vortex tube comprising a catalyst that may convert parahydrogen to orthohydrogen, which is an endothermic reaction that absorbs heat from the system. In so doing, the devices described herein may expel heat from the vortex tube in the form of orthohydrogen-rich hydrogen gas while maintaining cooled parahydrogen-rich hydrogen gas without moving parts, liquid refrigerants, or heavy circulating systems. Furthermore, the para-orthohydrogen conversion devices described herein may be used to liquefy hydrogen gas.

Before explaining examples of the devices and methods described herein, the following information regarding hydrogen gas and the dynamics of centrifugal geometries may be helpful. Diatomic molecules of hydrogen ($H_2$) have two different spin isomers, orthohydrogen and parahydrogen. In orthohydrogen molecules, the spins of the two protons are parallel and form a triplet state. In parahydrogen molecules, the spins of the two protons are antiparallel and form a singlet state. Due to these differing spin states, at standard temperature and pressure, hydrogen gas contains approximately 25% parahydrogen and 75% orthohydrogen. Higher percentages of orthohydrogen may be achieved by increasing temperature or otherwise introducing heat to hydrogen gas. This is primarily due to the increase in entropy caused by the increased temperature, which causes the hydrogen molecules to reach higher energy levels which favor orthohydrogen spin states. Higher percentages of parahydrogen may be achieved by decreasing temperature or otherwise extracting heat from hydrogen gas. This is primarily due to the decrease in entropy caused by the decreased temperature, which causes the hydrogen molecules to reach lower energy levels which favor the parahydrogen spin state. As such, in general, orthohydrogen-rich gas will exist at higher temperatures, while parahydrogen-rich gas will exist at lower temperatures.

Centrifugal geometries, such as vortex tubes, also known as Ranque-Hilsch vortex tubes, promote the controlled rotation of gas. In some applications, compressed air may be rotated within the vortex tube. As the air rotates, the centrifugal nature of the vortex tube allows the air located near the periphery of the vortex tube to move faster than the air located near the core or center of the vortex tube. Based on the thermodynamic approach to temperature, at a certain pressure, faster moving air molecules will have a higher temperature than slower moving molecules. Thus, in a vortex tube, faster moving air molecules located near the periphery of the vortex tube will have a higher temperature than the slower moving air molecules located near the center or core of the vortex tube. As such, by utilizing a vortex tube, air can be separated into hot and cold streams.

Moving now to the device described in the present disclosure, the device may comprise a vortex tube having a catalyst on at least a portion of an interior wall of the vortex tube to assist in the conversion of parahydrogen to orthohydrogen. In some examples, the catalyst may be disposed on substantially all of an interior surface of the vortex tube, while in other examples the catalyst may be disposed over less than all of the interior surface of the vortex tube. The catalyst may be ruthenium, copper, platinum, palladium, manganese, ferric oxide, silver, a rare earth metal, combinations of the foregoing, or any other catalyst that promotes the conversion of parahydrogen to orthohydrogen. The device may also comprise an inlet disposed on a first end of the vortex tube. The inlet may receive hydrogen gas, such as for example, pressurized hydrogen gas comprising approximately 50% orthohydrogen and approximately 50% parahydrogen. The device may also comprise a first outlet disposed on a second end of the vortex tube. The first outlet may comprise an opening on the perimeter of the second end of the vortex tube and a stopper disposed at the center of the second end of the vortex tube. The configuration of the first outlet may promote the release of hydrogen gas situated near the perimeter or periphery of the second end of the vortex tube, while hindering or preventing hydrogen gas situated near the center or core of the vortex tube from exiting the vortex tube. The shape of the stopper may also direct the hydrogen gas situated near the center or core of the vortex tube back toward the first end of the vortex tube. The device may further comprise a second outlet disposed on the first end of the vortex tube. The second outlet may promote the release of hydrogen gas situated near the center or core of the vortex tube.

In some examples, a method of operating the para-orthohydrogen conversion devices described herein may comprise transferring hydrogen gas into a proximal end of a vortex tube. At least a portion of an interior wall of the vortex tube may comprise a catalyst, such as, for example, ruthenium, copper, platinum, palladium, manganese, ferric oxide, silver, a rare earth metal, combinations of the foregoing, or any other catalyst that promotes the conversion of parahydrogen to orthohydrogen. In some examples, the hydrogen gas that is transferred into the vortex tube may be pressurized and may comprise a predetermined amount of parahydrogen and orthohydrogen at a certain temperature. For example, the hydrogen gas may be pressurized to approximately 50 psi at approximately 77 K and comprise approximately 50% parahydrogen and approximately 50% orthohydrogen. It should be noted that a specific pressure and temperature is not required and the temperatures and pressures described herein are for illustration only and are not by way of limitation. The hydrogen gas may be flowed from the proximal end of the vortex tube to the distal end of the vortex tube. As the hydrogen gas flows, the hydrogen gas may rotate within the vortex tube. The rotating hydrogen gas may contact the inner wall of the vortex tube, which comprises the catalyst, converting at least a portion of the parahydrogen to orthohydrogen. The reaction of the hydrogen gas with the catalyst is endothermic, which absorbs heat near the internal wall, or periphery, of the vortex tube, and creates cooler parahydrogen-rich gas that rotates near the center or core of the vortex tube.

A first outlet on the distal end of the vortex tube may be configured to allow the orthohydrogen-rich gas rotating on the periphery of the vortex tube to exit the vortex tube. The orthohydrogen-rich gas may have a higher temperature and lower pressure than the hydrogen gas that was initially transferred into the vortex tube. For example, the orthohydrogen-rich gas may have a temperature of approximately 120 K and have a reduced pressure of approximately 14 psi. The first outlet may also comprise a stopper or other component that hinders or prevents the parahydrogen-rich gas near the center or core of the vortex tube from exiting out the first outlet. The stopper may be shaped to promote the flow of parahydrogen-rich gas back toward the proximal end of the vortex tube. In some examples, the centerline of the stopper is ported, which may promote gas to enter the ported portion of the stopper. In other examples, the stopper may have a flat end, as opposed to a pointed end, that may allow the hydrogen gas on the periphery of the vortex tube exit the tube while creating a stopping point for the hydrogen gas near the center or core of the vortex tube. The parahydrogen-rich gas may exit the vortex tube through a second outlet disposed near the proximal end of the vortex tube. The parahydrogen-rich gas may have a lower temperature than both the initial hydrogen gas that was transferred into the vortex tube and the orthohydrogen-rich gas that rotates near the periphery of the vortex tube. For example, the parahydrogen-rich gas may have a temperature of approximately 30 K and may have a pressure similar to the orthohydrogen-rich gas, such as, for example, approximately 14 psi.

In some examples, a method of operating the para-orthohydrogen conversion devices described herein may include converting hydrogen gas to liquid hydrogen, also known as liquefaction. For example, hydrogen gas may be transferred into the proximal end of a vortex tube, at least a portion of the inner wall of which may comprise a catalyst. The hydrogen gas may be pressurized and may enter the vortex tube at a first temperature. In some examples, the hydrogen gas may be pre-cooled, such as by a liquid nitrogen bath. As the hydrogen gas flows from the proximal end of the vortex tube to the distal end, the hydrogen gas may rotate. The rotation may be caused, at least in part, by the direction of the flow of the hydrogen gas entering the vortex tube. The parahydrogen in the hydrogen gas may contact the catalyst and be converted to orthohydrogen, which is an endothermic reaction that absorbs heat from the system. The orthohydrogen-rich gas may accumulate near the periphery of the vortex tube at a temperature higher than the temperature of the initial hydrogen gas, while parahydrogen-rich gas may accumulate near the center or core of the vortex tube at a lower temperature than the initial temperature of the hydrogen gas, resulting in liquefaction of the parahydrogen-rich gas.

Para-orthohydrogen conversion devices according to this disclosure may be designed for a variety of applications, such as, for example, removal of heat in cryogenic conditions, cooling of various components of a system, and/or liquefaction of hydrogen gas.

One or more examples of the present disclosure are illustrated in the accompanying drawings. Those of ordinary skill in the art will understand that the systems and methods specifically described herein and illustrated in the accompanying drawings are non-limiting examples and that the scope of these examples is defined solely by the claims. The features illustrated or described in connection with one example may be combined with the features of other examples. For example, the compressor described in one example may be included in the system comprising the computing devices. Such modifications and variations are intended to be included within the scope of the appended claims.

Additional details are described below with reference to several examples.

Example Devices

FIGS. 1-4 illustrate various examples of para-orthohydrogen conversion devices. The sizes, shapes, and symbols used to describe the various components of the devices are used for illustration only and should not be used as limitations of the devices as described herein.

FIG. 1 illustrates a perspective view of an example of a para-orthohydrogen conversion device 100. Device 100 may comprise a vortex tube 102. As used herein, the term "vortex tube" means a cylindrical tube designed to promote the rotation of air within the tube. The diameter of the vortex tube 102 may vary depending on the application and desired amount of hydrogen conversion. For example, a larger-diameter vortex tube 102 may be utilized when conversion of a large volume of hydrogen gas is desired. The vortex tube 102 may be constructed of various materials, such as, for example, metal, polymer, or a combination thereof. The vortex tube 102 may be constructed by a number of methodologies, such as, for example, three-dimensional printing and/or metal working (e.g., extrusion, casting, boring, etc.). By way of example, a vortex tube 102 as used in the manner described herein for para-orthohydrogen conversion may be constructed from stainless steel, polyvinyl chloride, or other material sturdy enough to withstand the pressure differential as between the interior and exterior of the vortex tube 102. The vortex tube 102 may comprise an inlet 104 disposed on a first end of the vortex tube 102. The inlet 104 may be positioned such that gas is transferred into the vortex tube 102 tangentially or perpendicularly from the flow of gas through the vortex tube 102.

The vortex tube 102 illustrated in FIG. 1 may also comprise a first outlet 108 disposed on a second end of the vortex tube 102. The first outlet 108 may have various shapes and sizes. For example, the first outlet 108 may have the same or similar diameter as the vortex tube 102, or the first outlet 108 may have a smaller diameter than the vortex tube 102. A stopper 106 may be disposed at or near the center of the second end of the vortex tube 102. The stopper 106 may be conical shaped, with the point or vertex of the stopper 106 pointing in toward the vortex tube 102. The stopper 106 may be positioned such that only hydrogen gas located at or near the periphery of the vortex tube 102 may exit through the first outlet 108. In some examples, the stopper 106 may be adjustable, either manually or automatically, such that the stopper 106 may move axially into or out of the vortex tube 102. When the stopper 106 is adjusted more into the vortex tube 102, the opening between the stopper 106 and the interior wall of the vortex tube 102 may decrease. This decreased opening may decrease the air flow through the first outlet 108 and increase pressure within the vortex tube 102. When the stopper 106 is adjusted away from the vortex tube 102, the opening between the stopper 106 and the interior wall of the vortex tube 102 may increase. This increased opening may increase the air flow through the first outlet 108 and decrease pressure within the vortex tube 102. In some examples, the stopper 106 may include one or more grooves along the centerline of the stopper 106. The grooves may be received by threading disposed on the distal end of the vortex tube 102 and hold the stopper 106 in position.

Adjustment of the stopper 106 may also aid in more accurate transferring of orthohydrogen-rich gas from the vortex tube 102. For example, as described above, orthohydrogen-rich gas may accumulate at the periphery of the vortex tube 102, while parahydrogen-rich gas may accumulate at the center or core of the vortex tube 102. The thickness of the layer of orthohydrogen-rich gas and the thickness of the layer of parahydrogen-rich gas within the vortex tube 102 may differ depending on, for example, the initial concentrations of parahydrogen and orthohydrogen in the hydrogen gas transferred into the vortex tube 102, the pressure within the vortex tube 102, and the initial temperature of the hydrogen gas transferred into the vortex tube 102. As such, the orthohydrogen-rich periphery portion or layer may be larger in some applications or configurations than the orthohydrogen-rich periphery portion or layer in other applications or configurations. The stopper 106 position may be adjusted to account for such variances.

The stopper 106 may also hinder or prevent the parahydrogen-rich gas at or near the center of the vortex tube from exiting through the first outlet 108. Instead, the stopper 106 may promote the parahydrogen-rich gas to flow back toward the first end of the vortex tube 102. A second outlet 110 may be disposed on the first end of the vortex tube 102 and may be positioned to accept the parahydrogen-rich gas flowing toward the first end of the vortex tube 102. The second outlet 110 may be positioned at or near the center of the vortex tube 102, where the parahydrogen-rich gas is flowing.

Figure 2:
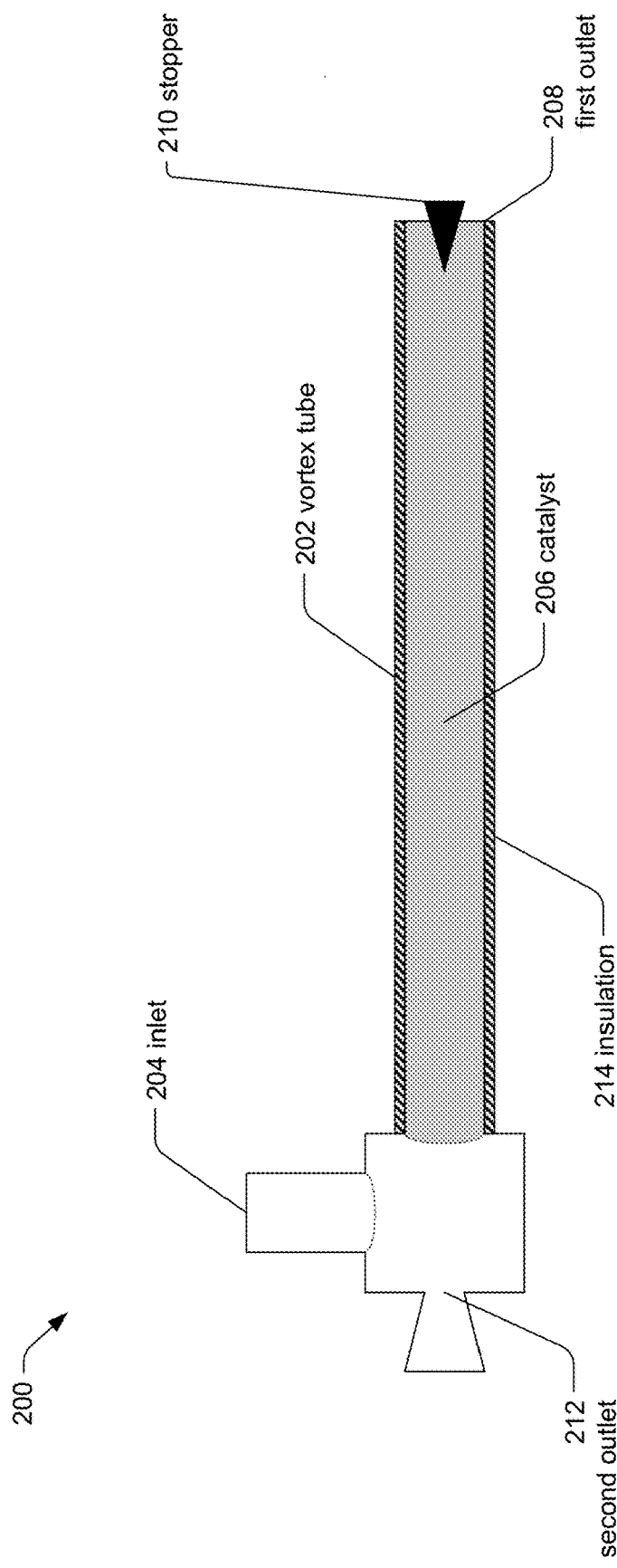
FIG. 2 illustrates a cross-sectional side view of an example para-orthohydrogen conversion device.

FIG. 2 illustrates a cross-sectional side view of an example of a para-orthohydrogen conversion device 200. The cross-section shown in FIG. 2 is made at or near the center of device 100 such that the inlet, first outlet, second outlet, and vortex tube are essentially split in half. Device 200 may comprise the same or similar components as device 100. For example, device 200 may comprise a vortex tube 202, an inlet 204, a first outlet 208, a second outlet 212, and a stopper 210. Device 200 may also comprise a catalyst 206 (shown as the shaded portion of FIG. 2). The catalyst 206 may comprise the material, or a portion thereof, that the vortex tube 202 is constructed of, and/or the catalyst 206 may comprise a coating disposed on the interior wall of the vortex tube 202. The catalyst 206 may be disposed on the entire interior wall of the vortex tube 202, or only a portion (i.e., less than all) thereof. The catalyst 206 may comprise ruthenium, copper, platinum, palladium, manganese, ferric oxide, silver, a rare earth metal, combinations of the foregoing, or any other catalyst that promotes the conversion of parahydrogen to orthohydrogen.

Device 200 may also comprise insulation 214, which may partially or completely cover an outer circumferential surface of the vortex tube 202. In some examples, the insulation may be constructed of one or more materials that hinder the exchange of heat between the interior and exterior of the vortex tube 202. The insulation 214 may comprise one or more layers, and when comprising multiple layers, the layers may be made of the same or differing materials. For example, the insulation 214 may comprise multi-layer insulation (MLI), silica-aerogel, spray-foam, vacuum, etc.

Figure 3:
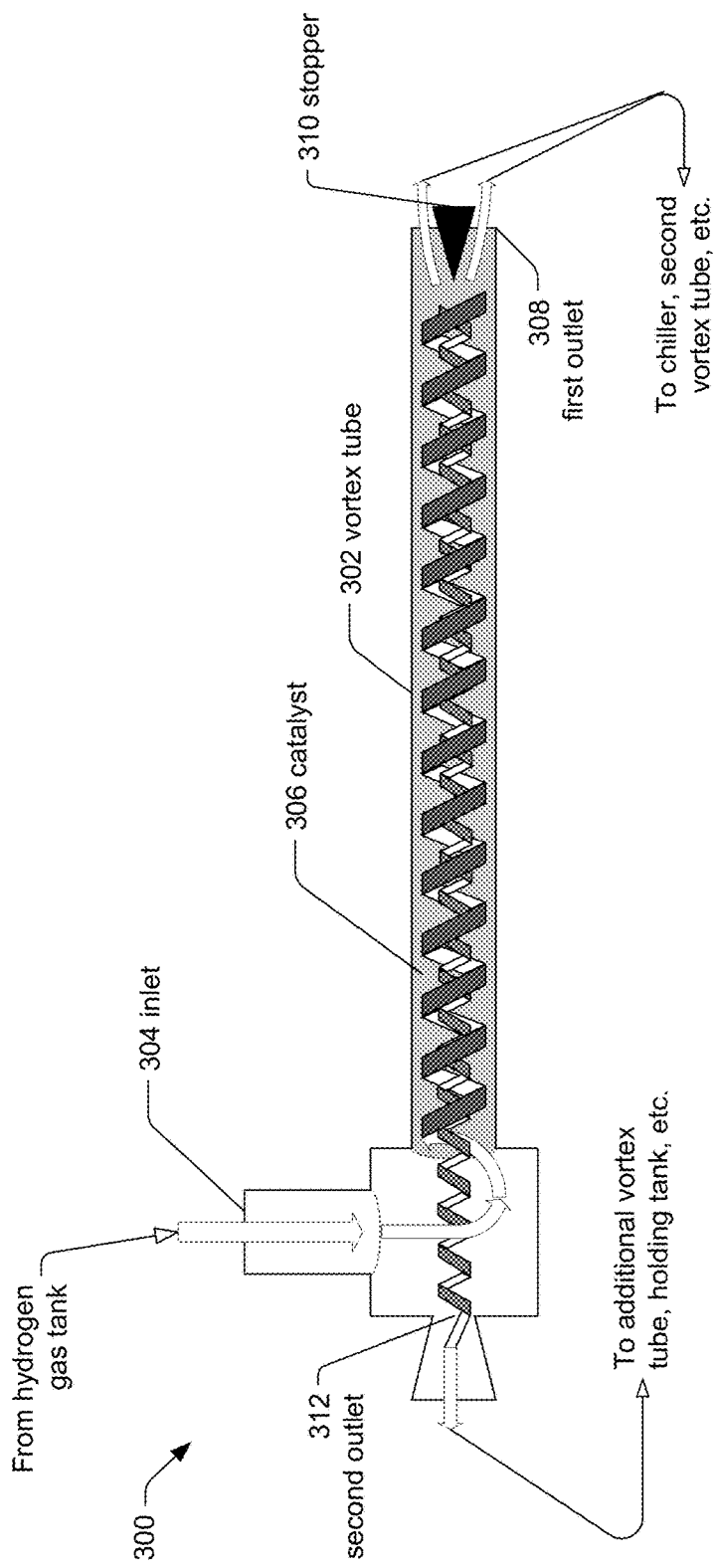
FIG. 3 illustrates a cross-sectional side view of another example para-orthohydrogen conversion device with flow indication.

FIG. 3 illustrates a cross-sectional side view of an example para-orthohydrogen conversion device 300 that shows the flow of hydrogen gas through the device. The cross-section shown in FIG. 3 is made at or near the center of device 100 such that the inlet, first outlet, second outlet, and vortex tube are essentially split in half. Device 300 may have the same or similar components as those shown in FIG. 2. For example, device 300 may comprise a vortex tube 302, an inlet 304, a catalyst 306, a first outlet 308, a stopper 310, and a second outlet 312. Directional arrows have been added to FIG. 3 to show an example flow of hydrogen gas through device 300. Starting at the inlet 304, hydrogen gas may be transferred into device 300 from a source, such as, for example, a pressurized hydrogen gas tank. The hydrogen gas may be pressurized, such as, for example, to around 50 psi, and may comprise a predetermined composition of parahydrogen and orthohydrogen, such as, for example, approximately 50% parahydrogen and approximately 50% orthohydrogen. Again, the temperature, pressure, and para-orthohydrogen composition described in this example are for illustration only and are not limiting. The hydrogen gas may travel through the inlet 304 and into the vortex tube 302. As the hydrogen gas enters the vortex tube 302, the hydrogen gas may begin to swirl or otherwise rotate. The rotating hydrogen gas may travel down the vortex tube 302 toward the first outlet 308. As the rotating hydrogen gas travels, at least a portion of the hydrogen gas makes contact with the interior wall of the vortex tube 302.

The interior wall of the vortex tube 302 may comprise a catalyst 306, which may convert all or a portion of the parahydrogen gas that contacts the interior wall into orthohydrogen, creating a layer of orthohydrogen-rich gas at the periphery of the vortex tube 302 via an endothermic reaction. The catalyzed reaction of parahydrogen to orthohydrogen may cause heat to be absorbed in the orthohydrogen-rich layer, which may cause the orthohydrogen-rich layer to rotate more quickly. The unreacted hydrogen gas may accumulate near the center or core of the vortex tube 302 and may contain more parahydrogen than orthohydrogen. This parahydrogen-rich layer may have a decreased temperature and rotate slower than the orthohydrogen-rich layer. When the hydrogen gas reaches the first outlet 308 of the vortex tube 302, the stopper 310 may allow the orthohydrogen-rich layer near the periphery of the vortex tube 302 to exit the vortex tube 302, while hindering or stopping the parahydrogen-rich layer near the center of the vortex tube 302 from exiting the vortex tube 302. The stopper 310 may redirect the parahydrogen-rich gas back toward the inlet 304. A second outlet 312 may be disposed on the end of the vortex tube 302 opposite the first outlet 308. The parahydrogen-rich gas may exit the vortex tube 302 through the second outlet 312 to a holding container or an additional vortex tube, for example.

Figure 4:
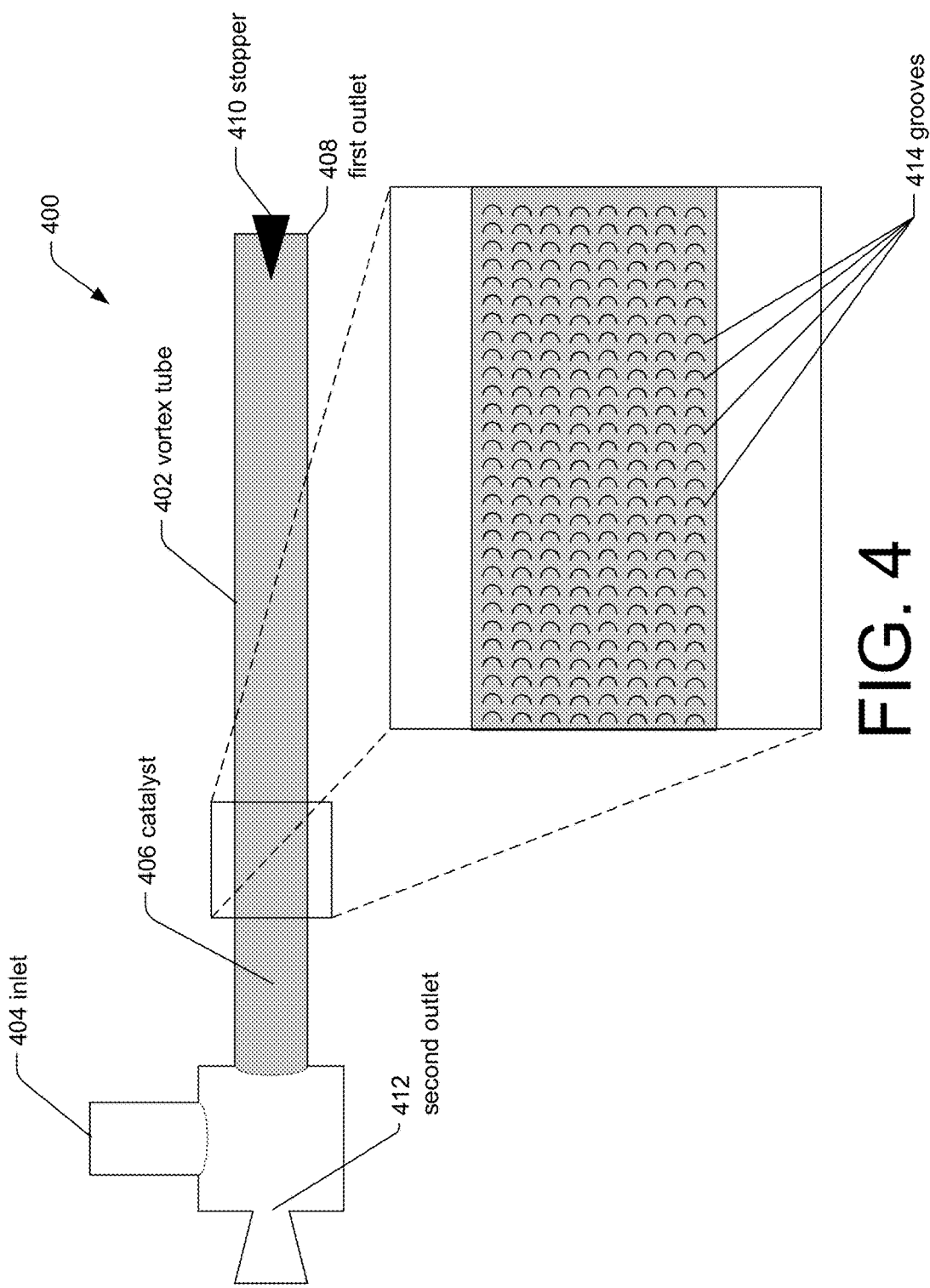
FIG. 4 illustrates a cross-sectional side view of a further example para-orthohydrogen conversion device, a portion of which has been magnified.

FIG. 4 illustrates a cross-sectional side view of an example para-orthohydrogen conversion device 400. Device 400 may have the same or similar components as those shown in FIG. 2. For example, device 400 may comprise a vortex tube 402, an inlet 404, a catalyst 406, a first outlet 408, a stopper 410, and a second outlet 412. Device 400 may also comprise a plurality of grooves 414. The grooves 414 are depicted in FIG. 4 as being semi-circular in shape, or otherwise described as scalloped, however, the grooves 414 may be of various shapes and sizes. The grooves 414 may also be spirals or channels in the interior surface of the vortex tube 402. Additionally, each groove 414 may have a uniform shape and size to other grooves 414, or each groove 414 may vary slightly or substantially in shape and size to other grooves 414. Furthermore, the grooves 414 may be indents or etchings in the vortex tube 402 or may be raised up from the surface of the interior wall of the vortex tube 402. The grooves 414 may increase the surface area of the catalyst 406 and provide for a larger number of reaction sites with the parahydrogen as it flows through the vortex tube 402.

Devices 100-400 may also include controllers and/or sensors (not illustrated) to monitor and control the pressure, temperature, and flow of hydrogen gas through the vortex tube, as well as valves and assemblies to open or close the flow of hydrogen through the inlet, first outlet, and/or second outlet. Additionally, gauges or other monitoring devices may be used to monitor pressure, temperature, flow rate, and hydrogen isomer content within the vortex tube. For example, para-orthohydrogen composition of vortex tube effluent may be measured via hot-wire anemometry.

As described in FIGS. 1-4, various components of devices 100-400 have been described as components of certain examples of the para-orthohydrogen conversion devices described herein. However, it should be understood that in some examples each component described herein may be included in any or all of devices 100-400, and the inclusion of a component in one example does not exclude its potential inclusion in other examples. Additionally, multiples of devices 100-400 may be coupled together to form a system that further promotes cryogenic cooling and liquefaction. For example, three para-orthohydrogen conversion devices, such as described herein, may be coupled together. Hydrogen gas may be transferred to a first conversion device and the resulting parahydrogen-rich gas may be transferred to a second conversion device. The parahydrogen-rich gas may undergo further conversion in the second conversion device such that the resulting parahydrogen reaches a temperature that allows for liquefaction of the hydrogen gas. The liquid hydrogen may be transferred from the second conversion device to a holding tank or other apparatus for storage or use. The orthohydrogen-rich gas from the first conversion device may be transferred to a third conversion device. The orthohydrogen-rich gas may undergo further conversion such that a portion of the remaining parahydrogen is converted to orthohydrogen. As such, the para-orthohydrogen conversion devices disclosed herein may be cascaded to increase cooling and liquefaction.

The devices described in FIGS. 1-4 have been shown to effectively convert parahydrogen to orthohydrogen, which allows for cryogenic refrigeration and liquefaction without the use of moving parts or heavy liquid circulation systems. These devices may allow for the efficient liquefaction of hydrogen, in some cases at or above 30% efficiency. The use of a catalyst, such as described herein, may increase the efficiency of cryogenic refrigeration and/or liquefaction. For example, a 69% difference in temperature separation between parahydrogen and orthohydrogen was noted in vortex tubes comprising a catalyst versus bare vortex tubes. Fluid flow modules, such as COMSOL computational fluid dynamics modeling, may be used to optimize flow of hydrogen gas and liquid hydrogen through the vortex tubes as described herein.

The present disclosure may find use with gases other than hydrogen. For example, the vortex tube design described herein may be used with gases such as deuterium ($^2$D), Tritium ($^3$H), Helium (He), and Neon (Ne). The same or substantially the same design described herein may be used to cool or liquefy the above-mentioned gases. The same or similar catalysts may be used, as well as the same or similar pressures, temperatures, and components of the devices, such as, for example, the vortex tube, first and second outlet, inlet, and stopper.

Example Methods

Figure 5:
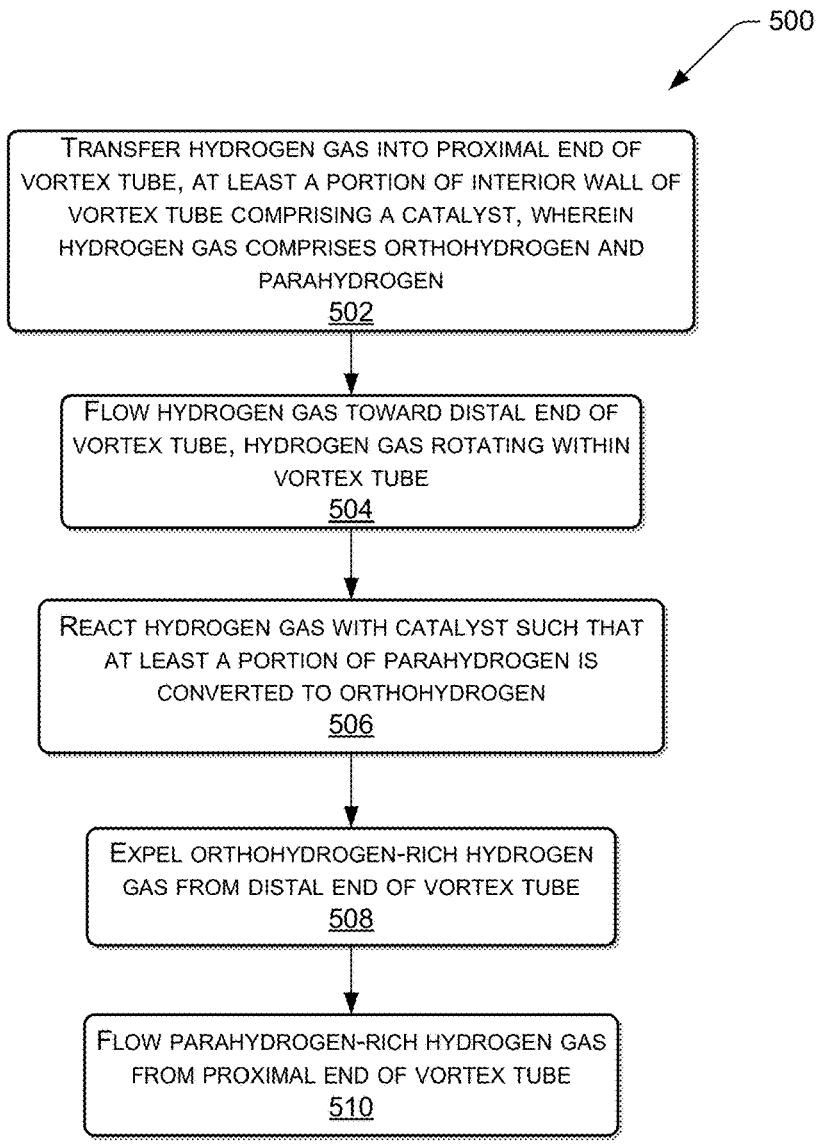
FIG. 5 is a flowchart illustrating an example method by which a para-orthohydrogen conversion device may operate.
Figure 6:
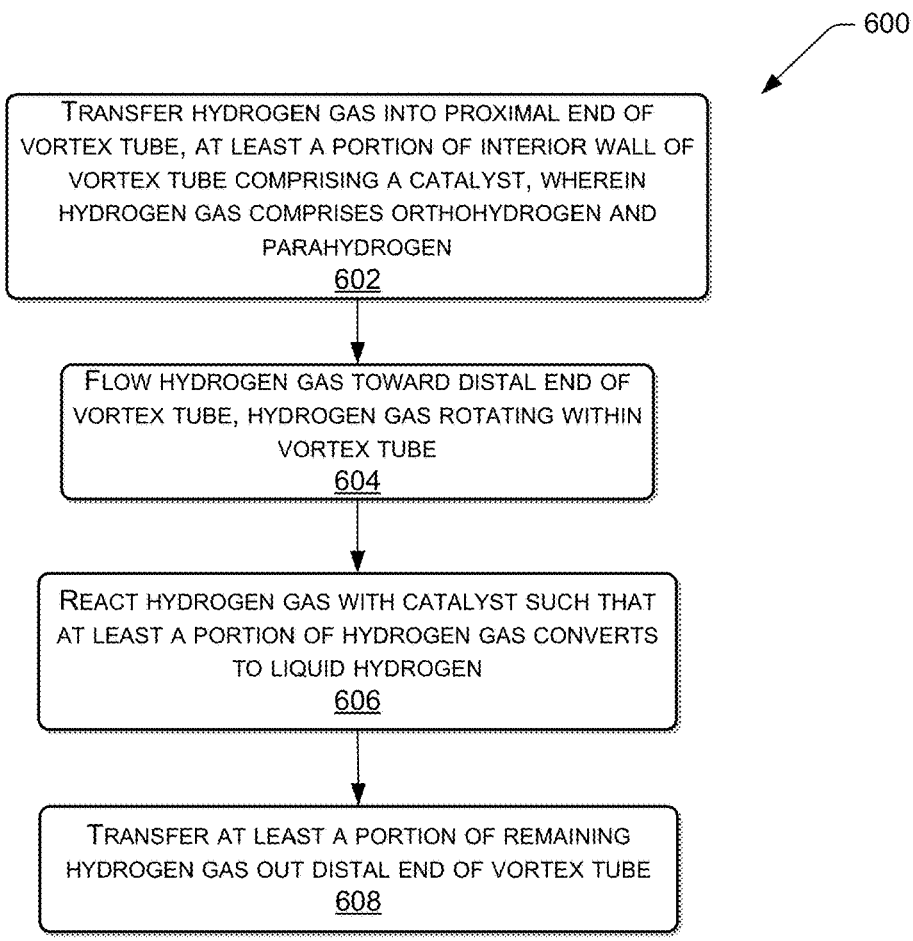
FIG. 6 is a flowchart illustrating another example method by which a para-orthohydrogen conversion device may operate.

FIGS. 5 and 6 illustrate example methods of operating a para-orthohydrogen conversion device, such as described herein. Methods 500 and 600 are illustrated as logical flow graphs. The order in which the operations or steps are described is not intended to be construed as a limitation, and any number of the described operations can be omitted, modified, or combined in any order and/or in parallel to implement methods 500 and 600. For example, while FIG. 6 depicts flowing hydrogen gas toward the distal end of the vortex tube with hydrogen gas rotating within the vortex tube before the hydrogen gas reacts with the catalyst, method 600 may comprise reacting the hydrogen gas with the catalyst before or at the same time as the hydrogen gas rotates within the vortex tube.

FIG. 5 illustrates a method 500 of operating a para-orthohydrogen conversion device. At block 502, method 500 may comprise transferring hydrogen gas into a proximal end of a vortex tube. In some examples, the transferred hydrogen gas may be pressurized, such as, for example, to approximately 50 psi. At least a portion of an interior wall of the vortex tube may comprise a catalyst. In some examples, the catalyst may be part or all of the material that the vortex tube is constructed from. In other examples, the catalyst may be a coating covering all or a portion of the interior wall of the vortex tube. The hydrogen gas that is transferred into the proximal end of the vortex tube may comprise orthohydrogen and parahydrogen. In some examples, the composition of the hydrogen gas may be more orthohydrogen than parahydrogen. In other examples, the composition of the hydrogen gas may be more parahydrogen than orthohydrogen. In other examples, the composition of the hydrogen gas may be approximately 50% orthohydrogen and approximately 50% parahydrogen.

At block 504, method 500 may comprise flowing the hydrogen gas toward a distal end of the vortex tube. As the hydrogen gas flows, the hydrogen gas may rotate within the vortex tube. The rotating hydrogen gas may create a vortex such that the hydrogen gas at the exterior or periphery of the vortex tube rotates more quickly than the hydrogen gas at the center or core of the vortex tube.

At block 506, method 500 may comprise reacting hydrogen gas with the catalyst such that a least a portion of the parahydrogen is converted to orthohydrogen. In some examples, the catalyst may be ruthenium, copper, platinum, palladium, manganese, ferric oxide, silver, a rare earth metal, combinations of the foregoing, or any other catalyst that promotes the conversion of parahydrogen to orthohydrogen. As the parahydrogen in the hydrogen gas contacts the catalyst, the reaction may produce an orthohydrogen-rich layer of hydrogen gas near the periphery of the vortex tube. The orthohydrogen-rich layer may have a higher temperature than the initial hydrogen gas that was transferred into the vortex tube. The reaction may be endothermic, which causes heat to be absorbed from the overall system into the orthohydrogen-rich layer. A parahydrogen-rich layer may accumulate near the center or core of the vortex tube. The parahydrogen-rich layer may have a lower temperature than the initial hydrogen gas and the orthohydrogen-rich layer. In some examples, the orthohydrogen-rich layer may comprise more orthohydrogen than parahydrogen, such as, for example, approximately 75% orthohydrogen and approximately 25% parahydrogen. In some examples, the parahydrogen-rich layer may comprise more parahydrogen than orthohydrogen, such as, for example, approximately 25% orthohydrogen and approximately 75% parahydrogen. Although the orthohydrogen-rich portion of the hydrogen gas and parahydrogen-rich portion of the hydrogen gas are described herein as layers, the two portions need not be distinct or separate. For example, a gradient of parahydrogen to orthohydrogen may exist in the vortex tube such that at various locations in the vortex tube, differing ratios may exist. In general, a greater percentage of orthohydrogen may be present at the periphery of the vortex tube, while a greater percentage of parahydrogen may be present at the center of the vortex tube. By way of further example, a velocity gradient may exist in the vortex tube such that gas rotating at the periphery of the vortex tube may rotate more quickly than gas rotating at the center of the vortex tube. The gas between the center and periphery may rotate at some speed between the speed of rotation at the center and the speed of rotation at the periphery.

At block 508, method 500 may comprise expelling the orthohydrogen-rich gas located at or near the periphery of the vortex tube out of the distal end of the vortex tube. The distal end of the vortex tube may comprise an outlet with a stopper, which may be adjustable. The stopper may have a conical shape, which may allow the orthohydrogen-rich gas located at or near the periphery of the vortex tube to exit the vortex tube while hindering or stopping the parahydrogen-rich gas located at or near the center of the vortex tube from exiting the vortex tube. The orthohydrogen-rich gas may exit the vortex tube at a temperature greater than the temperature of the initial hydrogen gas that was transferred into the vortex tube.

At block 510, method 500 may comprise flowing the parahydrogen-rich gas located at or near the center or core of the vortex tube toward the proximal end of the vortex tube. The parahydrogen-rich gas may rotate near the center of the vortex tube as it flows from the distal end to the proximal end. An outlet disposed at or near the proximal end of the vortex tube may receive the parahydrogen-rich gas and allow the parahydrogen-rich gas to exit the vortex tube. The parahydrogen-rich gas may exit the vortex tube at a temperature less than the temperature of the initial hydrogen gas and the orthohydrogen-rich gas.

All or a portion of the operations of method 500 may be performed at cryogenic temperatures, such as those found in space. The operation of method 500 may result in a cooled amount of parahydrogen-rich gas, which may be used to refrigerate a variety of containers and substances. For example, the parahydrogen-rich gas may reach 30K (−243° C.) or less. Liquid oxygen, a commonly used rocket propellant, has a freezing point of approximately 54K and a boiling point at approximately 90K. As such, the parahydrogen-rich gas may be utilized to maintain liquid oxygen in a frozen or liquid state during space travel until the liquid oxygen is needed for propulsion. By way of further example, liquid hydrogen is also a commonly used rocket propellant. Liquid hydrogen, however, has a tendency to "boil-off" or otherwise vaporize from ambient heat surrounding the vessel holding the liquid hydrogen. Method 500 may be utilized to direct the vaporized hydrogen gas toward a vortex tube to start the para-orthohydrogen conversion process. Method 500 may result in at least a portion of the vaporized hydrogen gas being cooled back to a liquid state. The re-liquefied hydrogen may be reintroduced to the liquid hydrogen holding tank, thus diminishing the adverse effects of "boil-off" Liquefaction is described in more detail below with respect to method 600.

FIG. 6 illustrates a method 600, which may include the same, different, or additional operations as method 500. At block 602, method 600 may comprise transferring hydrogen gas into a proximal end of a vortex tube. In some examples, the transferred hydrogen gas may be pressurized, such as, for example, to approximately 50 psi. At least a portion of an interior wall of the vortex tube may comprise a catalyst. In some examples, the catalyst may be part or all of the material that the vortex tube is constructed from. In other examples, the catalyst may be a coating covering all or a portion of the interior wall of the vortex tube. The hydrogen gas that is transferred into the proximal end of the vortex tube may comprise orthohydrogen and parahydrogen. In some examples, the composition of the hydrogen gas may be more orthohydrogen than parahydrogen. In other examples, the composition of the hydrogen gas may be more parahydrogen than orthohydrogen. In other examples, the composition of the hydrogen gas may be approximately 50% orthohydrogen and approximately 50% parahydrogen.

At block 604, method 600 may comprise flowing the hydrogen gas toward a distal end of the vortex tube. As the hydrogen gas flows, the hydrogen gas may rotate within the vortex tube. The rotating hydrogen gas may create a vortex such that the hydrogen gas at the exterior or periphery of the vortex tube rotates more quickly than the hydrogen gas at the center or core of the vortex tube.

At block 606, method 600 may comprise reacting at least a portion of the hydrogen gas with the catalyst such that at least a portion of the hydrogen gas converts to liquid hydrogen. In some examples, at least a portion of the parahydrogen in the hydrogen gas may contact the catalyst and be converted to orthohydrogen, causing an orthohydrogen-rich layer of hydrogen gas at or near the periphery of the vortex tube. Slower moving, parahydrogen-rich gas may accumulate at or near the center of the vortex tube. The temperature of the parahydrogen-rich gas may decrease to at or below the boiling point of hydrogen, which may result in all or a portion of the hydrogen gas changing to a liquid state. The vortex tube may be positioned such that as liquid hydrogen is formed, gravity may cause the liquid hydrogen to exit the vortex tube, such as through an outlet near the proximal end of the vortex tube. In some examples, such as in space travel application, little or no gravitational pull may be present. In these examples, a stopper, which may be conical shaped, may be disposed at or near the distal end of the vortex tube. The stopper may redirect the parahydrogen-rich gas near the center of the vortex tube back toward the proximal end of the vortex tube, which may comprise an outlet through which the liquid hydrogen may exit the vortex tube. The liquid hydrogen produced at or near the center of the vortex tube may comprise more parahydrogen than orthohydrogen, and in some examples, the liquid hydrogen may comprise all parahydrogen.

At block 608, method 600 may comprise transferring a remaining portion of the hydrogen gas out the distal end of the vortex tube. The remaining portion of the hydrogen gas may comprise more orthohydrogen than parahydrogen and may exit the vortex tube at a temperature greater than the initial hydrogen gas transferred into the vortex tube and the parahydrogen-rich gas and liquid hydrogen located at or near the center of the vortex tube. In some applications, such as space travel, the orthohydrogen-rich gas that exits the vortex tube may be used for heating applications, such as, for example, air conditioning of a living environment and heating of water or other liquids. The orthohydrogen-rich gas may also be cooled, such as by exposing the gas to temperatures found in space, which may convert all or a portion of the orthohydrogen back to parahydrogen. The hydrogen gas may then be reintroduced into the vortex tube for further cryogenic refrigeration or liquefaction purposes.

The term "about" or "approximate" as used in the context of describing a range of volume, pressure, or temperature is to be construed to include a reasonable margin of error that would be acceptable and/or known in the art.

The present description uses specific numerical values to quantify certain parameters relating to the innovation, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. These broad, intermediate, and narrow numerical ranges should be applied not only to the specific values, but should also be applied to differences between these specific values.

Furthermore, this disclosure provides various example implementations, as described and as illustrated in the figures. However, this disclosure is not limited to the examples described and illustrated herein, but can extend to other examples, as would be known or as would become known to those skilled in the art. Reference in the specification to "one example," "this example," "these examples," or "some examples" means that a particular feature, structure, or characteristic described is included in at least one example, and the appearances of these phrases in various places in the specification are not necessarily all referring to the same example.

Conclusion

Although the disclosure describes examples having specific structural features and/or methodological acts, it is to be understood that the claims are not necessarily limited to the specific features or acts described. Rather, the specific features and acts are merely illustrative of some examples that fall within the scope of the claims of the disclosure.

What is claimed is:

1. A method comprising:
   transferring hydrogen gas having 50% orthohydrogen and 50% parahydrogen and pressurized to at least 50 pounds per square inch into a proximal end of a vortex tube;
   flowing the hydrogen gas toward a distal end of the vortex tube, the hydrogen gas rotating within the vortex tube as the hydrogen gas flows toward the distal end;
   reacting a first portion of parahydrogen hydrogen gas of the hydrogen gas that contacts a catalyst on an interior wall into orthohydrogen gas, wherein the first portion creates a layer of orthohydrogen-rich gas at the periphery of the vortex tube via contact with the catalyst such that a second portion of the hydrogen gas in the center of the vortex tube converts to liquid hydrogen;
   expelling the orthohydrogen-rich hydrogen gas from the distal end of the vortex tube; and
   flowing parahydrogen-rich hydrogen gas out the proximal end of the vortex tube.

2. The method of claim 1, wherein the orthohydrogen-rich hydrogen gas comprises more orthohydrogen than parahydrogen.

3. The method of claim 1, wherein the orthohydrogen-rich hydrogen gas comprises 75% orthohydrogen and 25% parahydrogen.

4. The method of claim 1, wherein the parahydrogen-rich hydrogen gas comprises more parahydrogen than orthohydrogen.

5. The method of claim 1, wherein the parahydrogen-rich hydrogen gas comprises 75% parahydrogen and 25% orthohydrogen.

6. The method of claim 1, wherein the catalyst is selected from: ruthenium, copper, platinum, palladium, manganese, ferric oxide, silver, a rare earth metal, or a combination thereof.

7. The method of claim 1, expelling the orthohydrogen-rich gas includes expelling the orthohydrogen-rich gas at 120K.

8. The method of claim 6, wherein the catalyst coats at least an interior wall portion of the vortex tube.

9. The method of claim 1, wherein the hydrogen gas has a first temperature, wherein the orthohydrogen-rich hydrogen gas has a second temperature greater than the first temperature, wherein the parahydrogen-rich hydrogen gas has a third temperature less than the first temperature.

10. A method comprising:
transferring hydrogen gas having 50% orthohydrogen and 50% parahydrogen and pressurized to at least 50 pounds per square inch into a proximal end of a vortex tube;
flowing the hydrogen gas toward a distal end of the vortex tube, the hydrogen gas rotating within the vortex tube as the hydrogen gas flows toward the distal end; and
reacting a first portion of parahydrogen hydrogen gas of the hydrogen gas that contacts a catalyst on an interior wall into orthohydrogen gas, wherein the first portion creates a layer of orthohydrogen-rich gas at the periphery of the vortex tube via contact with the catalyst such that a second portion of the hydrogen gas in the center of the vortex tube converts to liquid hydrogen.

11. The method of claim 10, wherein the catalyst is selected from: ruthenium, copper, platinum, palladium, manganese, ferric oxide, silver, a rare earth metal, or a combination thereof.

12. The method of claim 10, wherein the liquid hydrogen comprises more parahydrogen than orthohydrogen by mass.

13. The method of claim 10, further comprising transferring a remaining portion of the hydrogen gas out the distal end of the vortex tube.

14. The method of claim 1, wherein the vortex tube comprises a first vortex tube, the catalyst comprises a first catalyst, and further comprising:
flowing the parahydrogen-rich hydrogen gas to a second vortex tube; and
reacting at least a portion of the parahydrogen-rich hydrogen gas with a second catalyst disposed within the second vortex tube such that liquid hydrogen is formed.

15. The method of claim 14, further comprising:
flowing the orthohydrogen-rich hydrogen gas to a third vortex tube; and
reacting at least a portion of the orthohydrogen-rich hydrogen gas with a third catalyst disposed within the third vortex tube such that liquid hydrogen is formed.

* * * * *